United States Patent
Al-Dossary

(10) Patent No.: US 12,252,976 B2
(45) Date of Patent: Mar. 18, 2025

(54) SYSTEMS AND METHODS FOR POSITIVE DISPLACEMENT MOTOR DIAGNOSTICS AND FAILURE PREDICTION

(71) Applicant: SAUDI ARABIAN OIL COMPANY, Dhahran (SA)

(72) Inventor: Abdullah Mohammed Al-Dossary, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 491 days.

(21) Appl. No.: 17/705,874

(22) Filed: Mar. 28, 2022

(65) Prior Publication Data
US 2023/0304388 A1   Sep. 28, 2023

(51) Int. Cl.
*G05B 19/048* (2006.01)
*E21B 4/02* (2006.01)
(Continued)

(52) U.S. Cl.
CPC .............. *E21B 44/005* (2013.01); *E21B 4/02* (2013.01); *E21B 47/12* (2013.01); *F04C 2/107* (2013.01);
(Continued)

(58) Field of Classification Search
CPC .......... E21B 44/005; E21B 4/02; E21B 47/12; F04C 2/107; F04C 2270/80; G05B 19/048
See application file for complete search history.

(56) References Cited

U.S. PATENT DOCUMENTS

| 9,429,008 B2 | 8/2016 | Beylotte |
| 10,683,743 B2 | 6/2020 | Benson et al. |

(Continued)

OTHER PUBLICATIONS

Schaeffler. "Bearing Failure: Causes and Cures", Barden Precision Bearings. pp. 1-15 (15 Pages).

(Continued)

*Primary Examiner* — Yuhui R Pan
(74) *Attorney, Agent, or Firm* — Osha Bergman Watanabe & Burton LLP

(57) ABSTRACT

Methods and systems relating to a drilling operation at a well site include a plurality of drilling parameters, which define the processes of the drilling operation, and a positive displacement motor. The positive displacement motor includes a plurality of embedded sensors, wherein each embedded sensor has an embedded sensor type and an embedded sensor location, a process control unit, and a communication line connecting the plurality of embedded sensors to the process control unit. A computer is communicably connected to the plurality of embedded sensors and includes one or more computer processors, and a non-transitory computer readable medium storing instructions executable by a computer processor. The instructions include functionality for: receiving a data stream from the plurality of embedded sensors; monitoring the data stream according to the embedded sensor type and the embedded sensor location; generating a first alert if at least one embedded sensor in the plurality of embedded sensors, as monitored by the data stream according to the embedded sensor type and the embedded sensor location, resides outside a plurality of pre-defined embedded sensor ranges; processing the data stream to predict a failure mode and time to the failure mode; and detecting a failure in the positive displacement motor and generating a second alert indicating the failure.

19 Claims, 5 Drawing Sheets

(51) Int. Cl.
*E21B 44/00* (2006.01)
*E21B 47/12* (2012.01)
*F04C 2/107* (2006.01)

(52) U.S. Cl.
CPC ........ *G05B 19/048* (2013.01); *F04C 2270/80* (2013.01)

(56) References Cited

U.S. PATENT DOCUMENTS

| | | |
|---|---|---|
| 11,047,222 B2 | 6/2021 | Benson et al. |
| 2011/0013522 A1* | 1/2011 | Kishigami ............... H04L 12/12 370/242 |
| 2019/0145240 A1* | 5/2019 | Benson ................. E21B 47/047 175/40 |
| 2020/0190959 A1 | 6/2020 | Gooneratne et al. |
| 2020/0277847 A1 | 9/2020 | Rojas et al. |
| 2021/0115742 A1 | 4/2021 | Agarwal et al. |
| 2021/0164336 A1 | 6/2021 | Benson et al. |
| 2021/0348490 A1 | 11/2021 | Wheatley et al. |
| 2022/0298909 A1* | 9/2022 | Till ........................... E21B 7/04 |

OTHER PUBLICATIONS

Jaeger, Thomas, et al. "Navi-Drill Motor Handbook", Baker Hughes Company, GM-GLB-DMTR-100274, 15th edition. Jan. 2020, pp. 1-238 [238 Pages].
A, Rev. "Motor Operations Hand book", Cougar Drilling Solutions, Version 5.0. Jan. 2012, pp. 1-171 [179 Pages].
Schlumberger. "PowerPak Steerable Motor Handbook", Schlumberger Drilling and Measurements, Schlumberger Educational Services. Jan. 2004, pp. 1-204 [204 Pages].

* cited by examiner

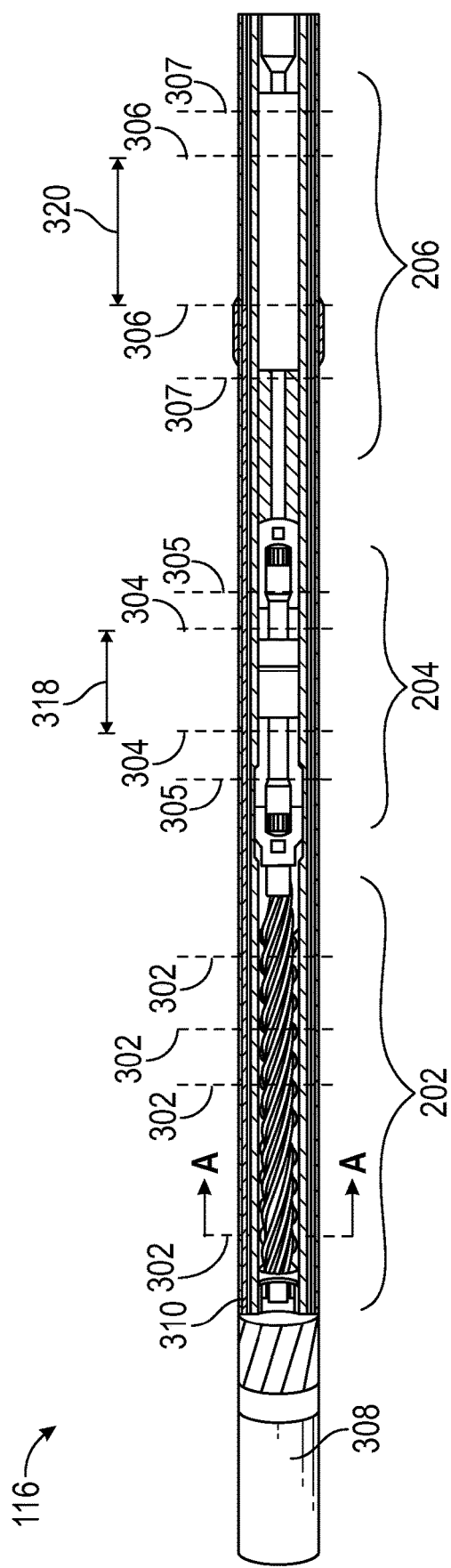
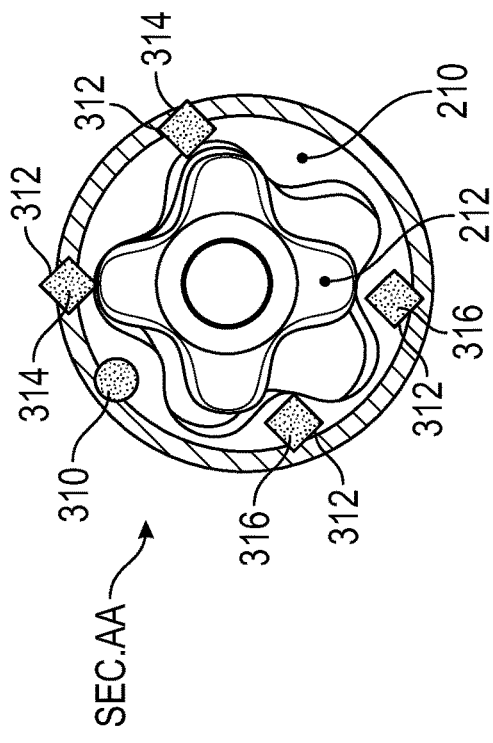
FIG. 3A
FIG. 3B

SYSTEMS AND METHODS FOR POSITIVE DISPLACEMENT MOTOR DIAGNOSTICS AND FAILURE PREDICTION

BACKGROUND

In the oil and gas industry, hydrocarbons are located in porous formations far beneath the Earth's surface. Wells are drilled into these formations to access and produce said hydrocarbons. Oftentimes, a drill bit, which is used to drill the well, is driven by a positive displacement motor.

Positive displacement motors may fail in a myriad of ways. For example, bearing assemblies contained within the positive displacement motor may overheat or spall, leading to undesired mechanical forces within the positive displacement motor and a reduction in performance, if not the mechanical failure, of the positive displacement motor. Faulty or underperforming positive displacement motors may need to be removed from the well, resulting in a costly delay of drilling operations, to diagnose the issue and make the relevant repairs or replace affected components.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed relate to a system regarding a drilling operation at a well site. The drilling operation encompasses a plurality of drilling parameters which define the processes of the drilling operation and a positive displacement motor. The positive displacement motor further includes a plurality of embedded sensors, wherein each embedded sensor has an embedded sensor type and an embedded sensor location. The positive displacement motor further includes a process control unit, a communication line connecting the plurality of embedded sensors to the process control unit, and a computer communicably connected to the plurality of embedded sensors. The computer has one or more computer processors, and a non-transitory computer readable medium storing instructions executable by a computer processor. The instructions have functionality for receiving a data stream from the plurality of embedded sensors, monitoring the data stream according to the embedded sensor type and the embedded sensor location, generating a first alert if at least one embedded sensor in the plurality of embedded sensors, as monitored by the data stream according to the embedded sensor type and the embedded sensor location, resides outside a plurality of pre-defined embedded sensor ranges, processing the data stream with an anomaly detection algorithm, processing the data stream to predict a failure mode and time to the failure mode, and detecting a failure in the positive displacement motor and generating a second alert indicating the failure.

In general, in one aspect, embodiments disclosed relate to a method. The method includes providing a positive displacement motor. The positive displacement motor includes a plurality of embedded sensors, wherein each embedded sensor has an embedded sensor type and an embedded sensor location. The positive displacement motor further includes a process control unit and a communication line connecting the plurality of embedded sensors to the process control unit. The method further includes receiving, by a computer processor, a data stream from the plurality of embedded sensors, monitoring, by the computer processor, the data stream according to the embedded sensor type and the embedded sensor location, generating a first alert if at least one embedded sensor in the plurality of embedded sensors, as monitored by the data stream according to the embedded sensor type and the embedded sensor location, resides outside a plurality of pre-defined embedded sensor ranges, processing, by the computer processor, the data stream with an anomaly detection algorithm, processing the data stream to predict a failure mode and time to the failure mode, and detecting a failure in the positive displacement motor and generating a second alert indicating the failure.

In general, in one aspect, embodiments disclosed relate to a non-transitory computer readable medium storing instructions executable by a computer processor. The instructions include functionality for: receiving a data stream from a plurality of embedded sensors wherein each embedded sensor has an embedded sensor type and an embedded sensor location; monitoring the data stream according to the embedded sensor type and the embedded sensor location; generating a first alert if at least one embedded sensor in the plurality of embedded sensors, as monitored by the data stream according to the embedded sensor type and the embedded sensor location, resides outside a plurality of pre-defined embedded sensor ranges; processing the data stream with an anomaly detection algorithm; processing the data stream to predict a failure mode and time to the failure mode; and detecting a failure in a positive displacement motor and generating a second alert indicating the failure.

Other aspects and advantages of the claimed subject matter will be apparent from the following description and the appended claims.

BRIEF DESCRIPTION OF DRAWINGS

FIG. 3A and FIG. 3B depict sensors in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
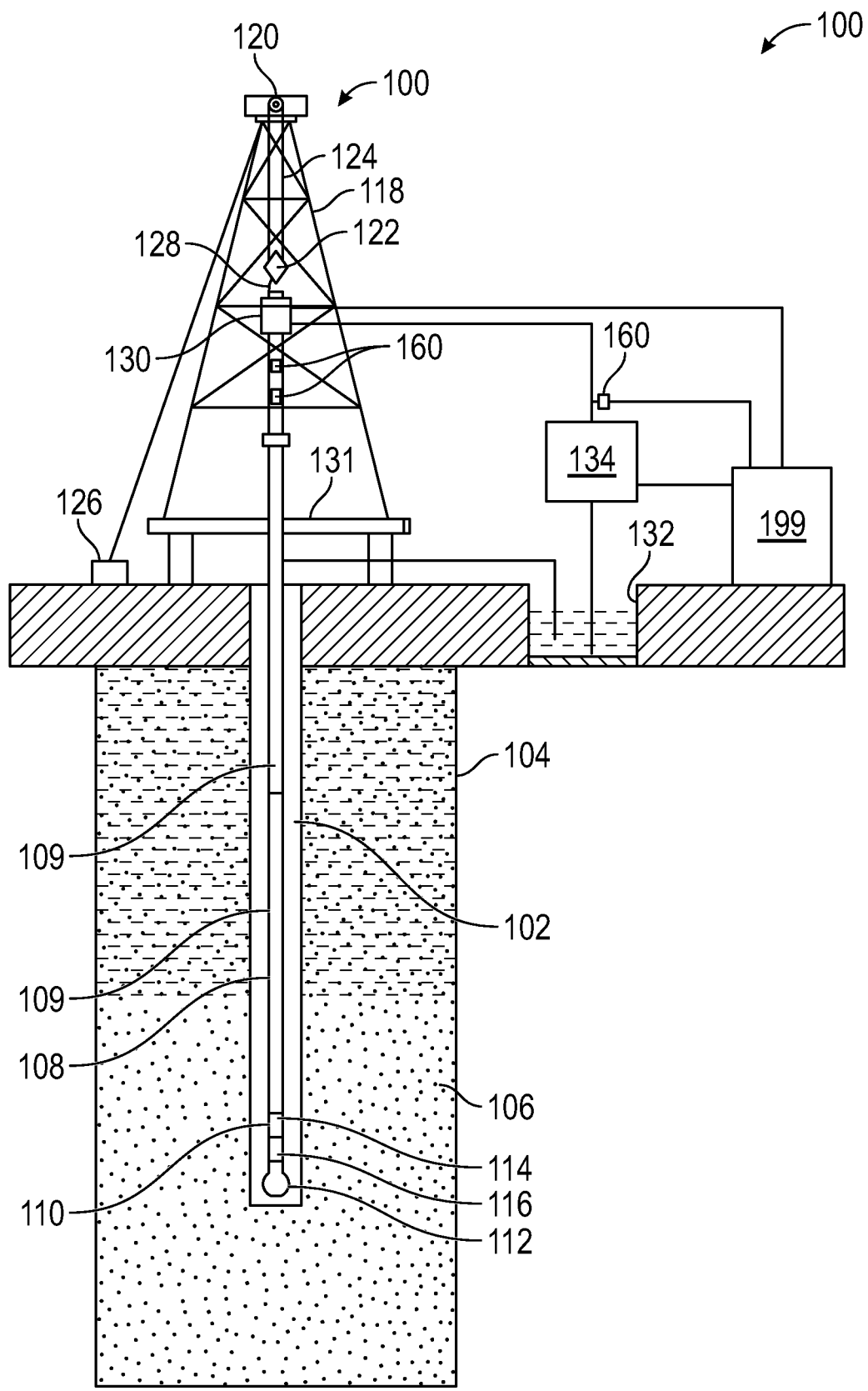
FIG. 1 is an exemplary well site in accordance with one or more embodiments.

FIG. 1 illustrates an exemplary well site (100). In general, well sites may be configured in a myriad of ways. Therefore, well site (100) is not intended to be limiting with respect to the particular configuration of the drilling equipment. The well site (100) is depicted as being on land. In other examples, the well site (100) may be offshore, and drilling may be carried out with or without use of a marine riser. A drilling operation at well site (100) may include drilling a wellbore (102) into a subsurface including various formations (104, 106). For the purpose of drilling a new section of wellbore (102), a drill string (108) is suspended within the wellbore (102).

The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools (114), such as a measurement-while-drilling (MWD) tool and logging-while-drilling (LWD) tool. Measurement tools (114) may include sensors and hardware to measure downhole drilling parameters, and these measurements may be transmitted to the surface using any suitable telemetry system known in the art. The BHA (110) and the drill string (108) may include other drilling tools known in the art but not specifically shown.

The drill string (108) may be suspended in wellbore (102) by a derrick (118). A crown block (120) may be mounted at the top of the derrick (118), and a traveling block (122) may hang down from the crown block (120) by means of a cable or drilling line (124). One end of the cable (124) may be connected to a drawworks (126), which is a reeling device that may be used to adjust the length of the cable (124) so that the traveling block (122) may move up or down the derrick (118). The traveling block (122) may include a hook (128) on which a top drive (130) is supported.

The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called mud) may be stored in a mud pit (132), and at least one pump (134) may pump the mud from the mud pit (132) into the drill string (108). The mud may flow into the drill string (108) through appropriate flow paths in the top drive (130) (or a rotary swivel if a rotary table is used instead of a top drive to rotate the drill string (108)).

In one implementation, a system (199) may be disposed at or communicate with the well site (100). System (199) may control at least a portion of a drilling operation at the well site (100) by providing controls to various components of the drilling operation. In one or more embodiments, system (199) may receive data from one or more sensors (160) arranged to measure controllable parameters of the drilling operation. As a non-limiting example, sensors (160) may be arranged to measure: weight on bit (WOB), drill string rotational speed (RPM), flow rate of the mud pumps (GPM), and rate of penetration of the drilling operation (ROP). In one or more embodiments, the drilling operation may be controlled by the system (199).

Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired physical stimulus.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor. In accordance with one or more embodiments, the drilling motor is a positive displacement motor (116) located on the distal end of the drill string (108) as part of the BHA (110). In further embodiments, the drill bit (112) may be rotated using a combination of the drilling motor, such as a positive displacement motor (116), and the top drive (130) (or a rotary swivel if a rotary table is used instead of a top drive to rotate the drill string (108)). While cutting rock with the drill bit (112), mud is pumped into the drill string (108).

The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings.

The mud with the cuttings is returned to the pit (132) to be circulated back again into the drill string (108). Typically, the cuttings are removed from the mud, and the mud is reconditioned as necessary, before pumping the mud again into the drill string (108).

When using a positive displacement motor (116), the mud flows through a helically lobed metallic rotor and a helically lobed elastomeric stator to produce rotation of the rotor relative to the stator. The rotation is transferred to the drill bit (112).

While drilling the wellbore (102), as described above, if using a positive displacement motor (116), the positive displacement motor (116) may fail, or otherwise become compromised and experience a degradation in performance. Replacement or repair of a positive displacement motor (116) may require the drill string (108) to be removed from the wellbore (102) resulting in a costly procedure and a delay in drilling operations. Furthermore, while inspecting a positive displacement motor (116), it may not be readily apparent which component, or components, need to be fixed or replaced. As such, diagnosing positive displacement motor (116) issues adds an additional layer of complexity that must be resolved before resuming drilling operations. Therefore, a self-diagnosing positive displacement motor (116), which can present information about the location and type of failure is beneficial. Moreover, a positive displacement motor (116) which can monitor, in real-time or near real-time, the health of its internal components such that drilling parameters may be altered to prevent failure or such that a failure mode and a failure location may be predicted, is advantageous. As such, embodiments disclosed herein present systems and methods for a positive displacement motor (116) with embedded sensors wherein the positive displacement motor (116) is able to transmit information regarding its state and health over a variety of locations and components within itself using multiple metrics. The transmitted information may be used for, among other things: diagnostics; failure mode identification; failure location identification; anomaly alerts; drilling parameter guidance; and prediction capabilities.

Figure 2:
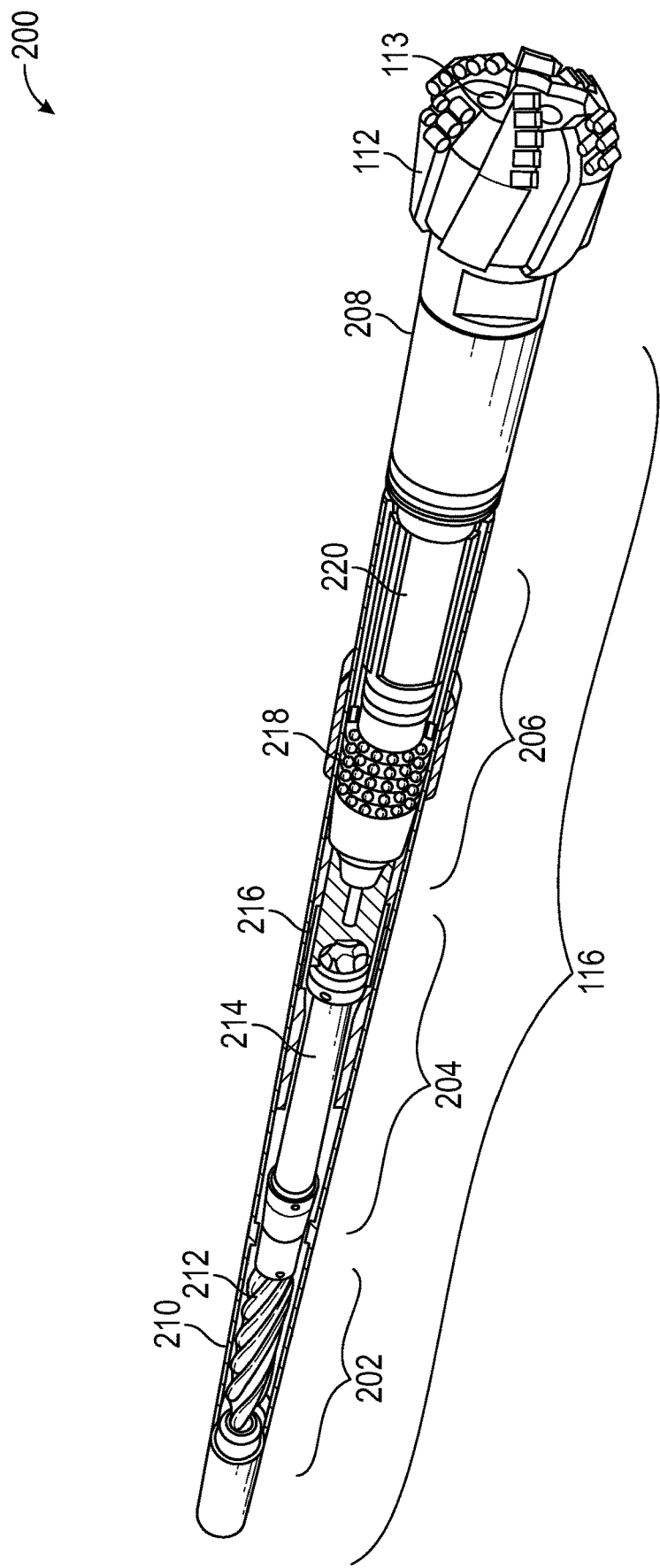
FIG. 2 depicts a positive displacement motor and drill bit in accordance with one or more embodiments.

FIG. 2 shows a positive displacement motor (116) in accordance with one or more embodiments. More specifically, FIG. 2 identifies three sections of the positive displacement motor (116), grouped, generally, by function.

The first section is the power section (202) which typically consists of two components: a stator (210) and a rotor (212). The stator (210) is composed of a steel tube containing an elastomeric insert, bonded to the steel tube. The elastomer has a lobed helical pattern bored though its center. The elastomer may be of even thickness, wherein, the lobed helical pattern is derived from the surround steel pipe, or may be of variable thickness. The elastomer material is chosen to resist degradation which may occur during operation; for example, through contact with abrasive fluids and solids, by deflections in the stator (210), and by experiencing variable operating temperatures. As such, common elastomer grades used are nitrile or acrylonitrile butadiene rubber grades. Likewise, the circumferential surface of the rotor (212) is shaped in a lobed helical pattern.

When the rotor (212) is installed into the stator (210), the combination of the helical shapes form sealed flow cavities between the two components. When mud is forced through the power section (202) the pressure drop across the cavities will cause the rotor (212) to rotate epicyclically inside the stator (210), such that the rotor (212) both rotates around its longitudinal axis and "walks around" the inside of the stator (210). As stated, the rotation is eventually supplied to the drill bit (112).

There are many ways the stator (210) and the rotor (212) of the power section (202) can be configured. Such as the number of lobes on the stator (210) and the rotor (212), the number of stages (full twists made by the lobes along the longitudinal axis), and the diameter of the assembly. The configuration defines operational parameters, like the revolutions per minute and the amount of torque output to the drill bit (112) for a given pressure drop. Different configurations may be adopted for different drilling operation needs, such as most efficient operational parameters for a given drill bit (112) and type of subsurface formations (104, 106). The description of the power section (202) of a positive displacement motor (116), and its various components and configurations, is not intended to be comprehensive and one with ordinary skill in the art will appreciate that the provided description is non-limiting with respect to the present disclosure.

The second section of the positive displacement motor (116) is the transmission section (204). The transmission section (204) generally consists of a continuous velocity (CV) assembly (214) or a universal joint.

The transmission section (204) serves to eliminate the eccentric motion of the rotor (212) and accounts for effects of the fixed or adjustable bend housing (216). The adjustable bend housing (216) allows for the positive displacement motor (116) to be steerable providing control over the wellbore (102) trajectory. The transmission section (204) must also allow the correct axial relationship of the rotor (212) to the stator (210) as, as previously described, the rotor (212) "walks around" the stator (210) in order to ensure efficient rotor (212) to stator (210) sealing and minimize rotor (212) and stator (210) wear.

The transmission section (204) transmits torque, derived from the rotation of the rotor (212), and down-thrust to the driveshaft (220). The driveshaft is located in the third section of the positive displacement motor (116), the bearing assembly section (206). The driveshaft (220) is held in place concentrically by a plurality of bearings (218) which typically consist of multiple thrust bearing cartridges and multiple radial bearings.

The thrust bearings support the down thrust of the rotor (212) and the reactive upward loading from the applied weight on the drill bit (112). For larger diameter positive displacement motors (116), the thrust bearings are usually of multi-stack ball and track design. Whereas small diameter positive displacement motors (116) typically utilize carbide friction bearings. In accordance with one or more embodiments, metallic and non-metallic radial bearings are employed above and below the thrust bearings to absorb lateral forces from contact with the driveshaft (220). Materials for the radial bearing are selected and manufactured to provide reliable operation of the positive displacement motor (116). In accordance with one or more embodiments, the bearing assembly section (206) may also contain a flow restrictor.

As shown in FIG. 2, the positive displacement motor (116) is connected to the drill bit (112) using a bit box (208), although other connections or intermediate assemblies may be used. Mud may exit the drill bit (112) through a plurality of nozzles (113) disposed on the drill bit (112) which provide a hydraulic connection between the internal volume of the drill string (108) (the passage for the mud) and the external environment; which during drilling operations is the wellbore (102).

In accordance with one or more embodiments, in order to provide diagnostic capabilities, locate and identify failure areas and modes, respectively, detect anomalies, guide drilling parameters, and predict performance metrics and failures, a variety of embedded sensors are placed in the positive displacement motor (116). These embedded sensors include revolutions per minute (RPM) sensors, temperature sensors, and ultrasonic sensors.

FIG. 3A provides another view of an embodiment of a positive displacement motor (116) and indicates the location of the embedded sensors. Like FIG. 2, the positive displacement motor (116) is divided into three general groups based on function: the power section (202); the transmission section (204); and the bearing assembly section (206).

In accordance with one or more embodiments, a plurality of sensor sets (4 shown), wherein each set contains a plurality of ultrasonic sensors, are embedded in the power section (202) of the positive displacement motor (116) at the ultrasonic sensor set locations (302). The plurality of ultrasonic sensors contained within a set are disposed on the same radial plane. The ultrasonic sensors are capable of measuring the thickness of the elastomeric stator (210). Elastomeric stator (210) thickness is expected to decrease with wear. As such, the ultrasonic sensors may identify and quantify they amount of wear in the elastomeric stator (210).

FIG. 3B depicts a cross-section of the power section (202) along the slice AA of FIG. 3A. As seen in FIG. 3B, an elastomeric stator (210) with variable thickness composed of five lobes encircles a rotor (212) with four lobes. In accordance with one or more embodiments, the set of ultrasonic sensors shown in FIG. 3B is composed of four ultrasonic sensors (312). An ultrasonic sensor (312) may be located in the trough of a lobe (314) or between lobes (316). In particular, FIG. 3B demonstrates a system wherein two ultrasonic sensors (312) are located in the trough of a lobe (314) and two are located between lobes (316).

Returning to FIG. 3A, a plurality of sensor sets (2 shown), wherein each set contains a plurality of RPM sensors, are embedded along radial planes within the transmission section (204) at transmission RPM sensor set locations (304).

Likewise, a plurality of sensor sets (2 shown), wherein each set contains a plurality of temperature sensors, are embedded along radial planes within the transmission section (204) at the transmission temperature sensor set locations (305). The axial distance between the radial plane of each set of RPM sensors in the transmission section (204) is known and depicted by the transmission sensors axial distance (318) marker.

The temperature sensors within the transmission section (204) measure the temperature proximate their location. The RPM sensors measure the rotation speed of the shaft. In some embodiments, the RPM sensors, along with knowledge of transmission sensors axial distance (318), and other relevant features like material type, may be used to determine the applied torque within the transmission section (204).

Likewise, a plurality of sets (2 shown), wherein each set contains a plurality of RPM sensors, are embedded along radial planes within the bearing assembly section (206) at the bearing assembly RPM sensor set locations (306). A plurality of sets (2 shown), wherein each set contains a plurality of temperature sensors, are embedded along radial planes within the bearing assembly section (206) at the bearing assembly temperature sensor set locations (307). The axial distance between the radial plane of each set of RPM sensors in the bearing assembly section (206) is known and depicted by the bearing assembly sensors axial distance (320) marker.

The temperature sensors within the bearing assembly section (206) measure the temperature proximate their location. The RPM sensors measure the rotation speed of the bearings. In some embodiments, the RPM sensors, along with knowledge of bearing assembly sensors axial distance (320), and other relevant features like material type, may be used to determine the applied torque within the bearing assembly section (206).

The embedded sensors are electrically connected by a communication line (310). The communication line (310) is connected to a process control unit (PCU) (308). In accordance with one or more embodiments, in FIG. 3A, the PCU (308) is located within the positive displacement motor (116) on the end opposite the drill bit (112). However, the PCU may be placed in other portions of the positive displacement motor (116), or in the BHA. The PCU (308) may communicate and interchange information, such as the measurements of each sensor, in real-time or near real-time, to operators on the surface using mud pulse telemetry.

It is noted that the type, quantity, and location of the embedded sensors as depicted in FIG. 3A are provided as an example. One with ordinary skill the art will appreciate that embedded sensor locations, and the quantity and types of the embedded sensors, may be adjusted without departing from the scope of this disclosure.

Embedded sensor information, communicated by the PCU (308) to the surface using mud pulse telemetry, is received and processed by a computer (502). Because the embedded sensor information is being received in real-time or near real-time, the received information may be considered a data stream. In addition to the receiving the data stream, the computer (502) is informed about the types of embedded sensors—RPM, ultrasonic (312), or temperature—and the embedded sensor locations within the positive displacement motor (116). As such, the computer (502) can parse the data stream to indicate the value of each embedded sensor, properly dimensionalized, according to its location in the positive displacement motor (116). The computer (502) may also preserve a time-series history of the values received by each embedded sensor.

Figure 4:
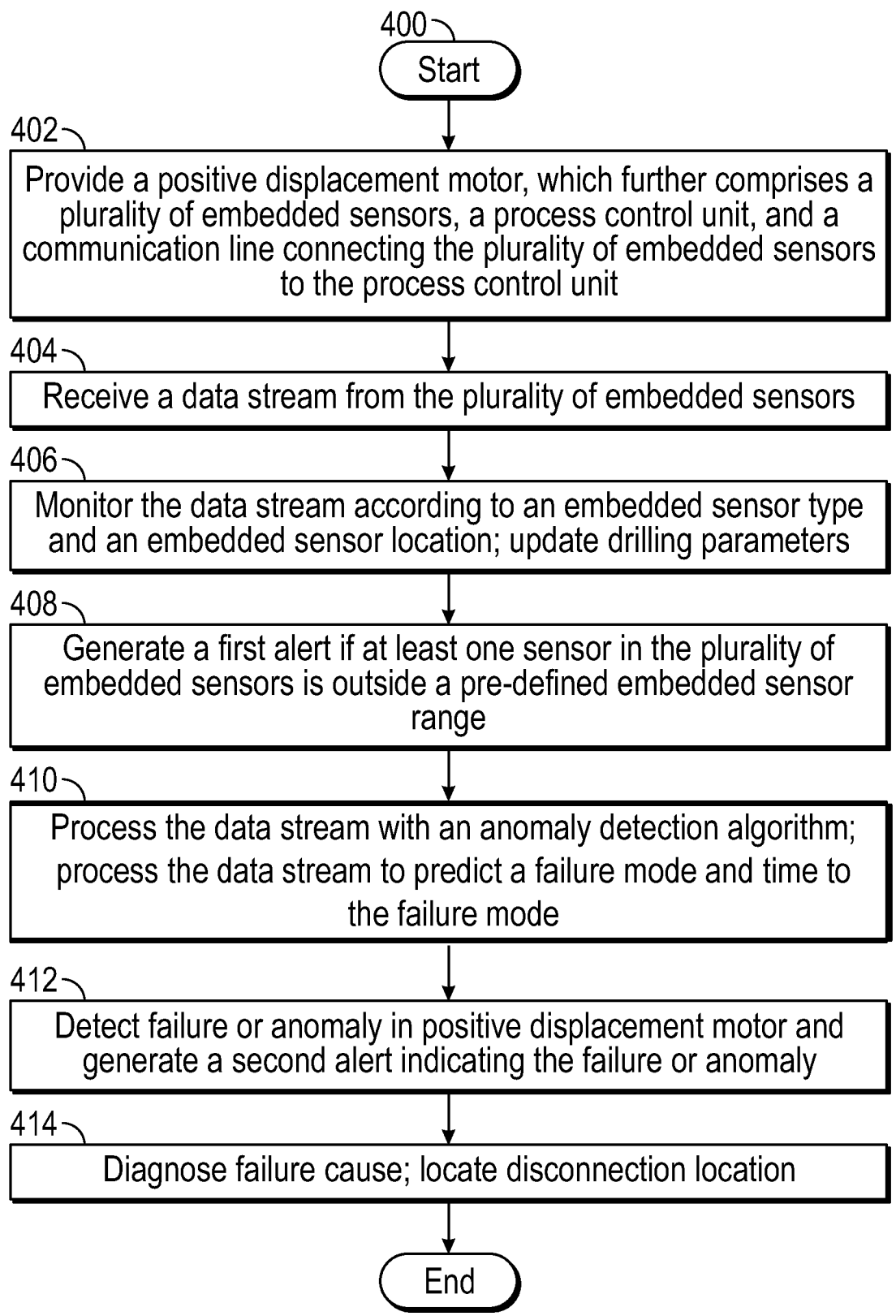
FIG. 4 shows a flowchart in accordance with one or more embodiments.

The process of receiving and making use of the data stream, by the computer (502), is depicted in FIG. 4, according to one or more embodiments. As shown in block 402, first, a positive displacement motor (116) with at least one embedded sensor, a process control unit, and a communication line, as previously described, is provided. As depicted in block 404, the data stream produced by the plurality of sensors is received.

In accordance with one or more embodiments, and as illustrated in block 406, using the computer (502), the data stream may be monitored according to embedded sensor type and embedded sensor location. The data stream may be displayed or otherwise visualized. Additionally, based on the read-outs of the embedded sensors, which represent the overall health and state of components of the positive displacement motor (116), the drilling parameters may be updated. The computer system (502) may be used to recommend a change in the drilling parameters to prevent failure or increase performance of the positive displacement motor (116).

For each embedded sensor, a user may indicate a range of acceptable values. For example, the acceptable temperature range of the bearing assembly section (206) may be determined by referencing the acceptable bearing temperature range as specified by the bearing manufacturer. If an embedded sensor reports a value which resides outside of the pre-defined acceptable range for said embedded sensor, a first alert is generated, as depicted in block 408. For example, a first alert may indicate that the bearing assembly section (206) is exceeding the pre-defined temperature range. This first alert may indicate that a failure has occurred within the bearing assembly section (206), or that a failure is likely to occur and preventative actions should be taken.

In accordance with one or more embodiments, the data stream, is continually processed and monitored, using the computer (502), by an anomaly detection algorithm as shown in block 410. The anomaly detection algorithm serves to detect systematic, or sudden, changes in the data stream, identify drifts in the data stream, and recognize outliers in the data stream. The anomaly detection algorithm may be any algorithm known in the art, such as, but not limited to, density-based techniques, correlation-based techniques, one-class support vector machines, and isolation forests. As given in block 412, if an anomaly, or other indication of a failure within the positive displacement motor (116), is detected by the anomaly detection algorithm, a second alert is generated.

Additionally, as shown in block 410 the data stream may be processed to predict a failure mode and time to the failure mode. A failure mode may be described as the identification of the location of a failure and the component or cause of the failure. With this knowledge in hand, an operator may proactively pull the positive displacement motor (116) from the wellbore (102) before a catastrophic failure. The positive displacement motor (116) may be replaced or repaired. In the latter case, the predictive capability provides the benefit that the expected failure mode is known. That is, the predicted location of failure, or faulty component, is known; reducing inspection and repair time.

If a failure or anomaly is detected, a user, with knowledge of the state of the positive displacement motor (116) and the location of the failure, may diagnose the issue and correlate the issue with a cause as depicted in block 414. In addition to identifying a failure within the positive displacement motor (116), by either monitoring the data stream or processing the data stream with an anomaly detection algorithm, the disclosed system has the added benefit that if a "twist-off" or "drop-off" event occurs in the positive displacement motor (116), the communication line (310) will become severed resulting in a disconnection of at least one embedded sensor. As such, a dislocation location may be determined using the communication line (310). Knowledge of the dislocation location, and thus the twist-off or drop-off location, may be used to guide decisions to pull the drilling equipment out of the wellbore (102). Furthermore, the dislocation location may guide decisions for how to perform fishing operations, wherein procedures are undertaken to remove broken, disconnected, or stuck equipment from the wellbore (102).

While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Embodiments of the present disclosure may provide at least one of the following advantages. Degradation of positive displacement motor (116) performance may be identified early. The location of failures in the positive displacement pump are identified by the embedded sensors, allowing for easy and fast corrective action without a time-consuming investigation. Information regarding early performance degradation and prediction of failures may be used to prevent catastrophic failures; either by adjust drilling parameters or removing the drilling equipment before a twist-off or drop-off event. By preventing a twist-off or drop-off event, time-consuming and economically costly fishing operations may be avoided. Additionally, embodiments of the present disclosure eliminate human errors in identifying the downhole problems which eliminates unnecessarily pulling drilling equipment out of the hole for inspection. This, in turn, reduces non-productive time while drilling.

Figure 5:
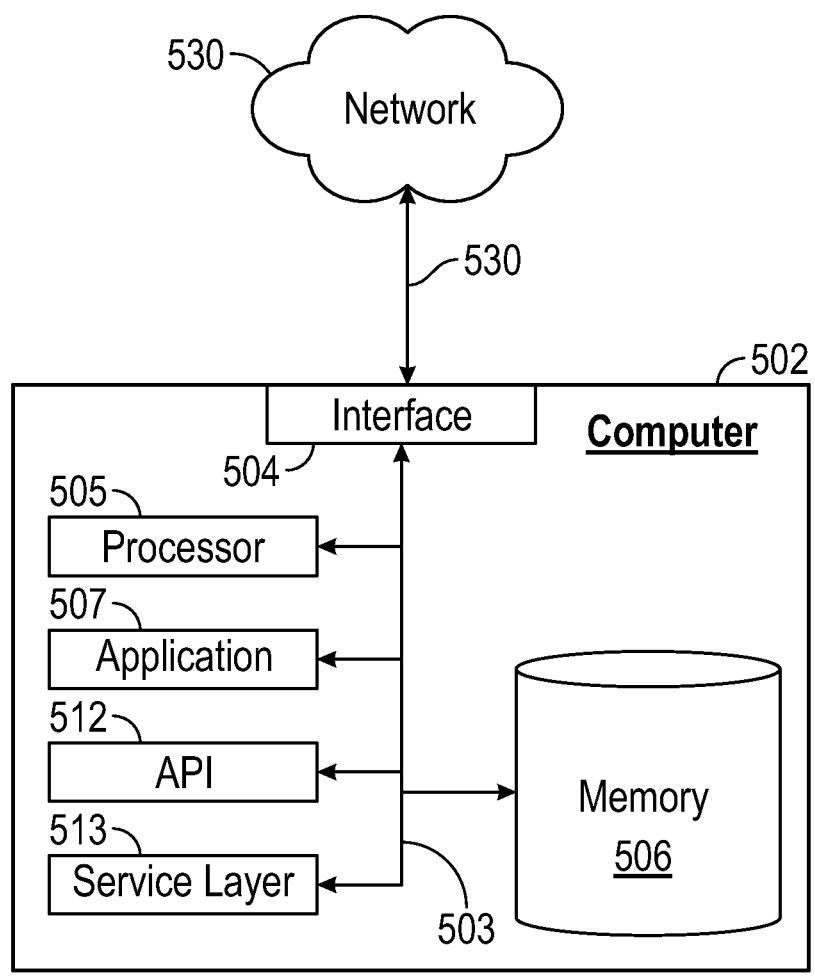
FIG. 5 depicts a system in accordance with one or more embodiments.

FIG. 5 further depicts a block diagram of a computer system (502) used to provide computational functionalities associated with the algorithms, methods, functions, processes, flows, and procedures as described in this disclosure, according to one or more embodiments. The illustrated computer (502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or another suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504) includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). The memory may be a non-transitory computer readable medium. For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), wherein each computer (502) communicates over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A system, comprising:
    a drilling operation at a well site, wherein the drilling operation comprises a plurality of drilling parameters which define the processes of the drilling operation and a positive displacement motor, wherein the positive displacement motor comprises:
        a power section comprising a stator and a rotor, wherein the rotor is configured to rotate within the stator in response to a passage of drilling mud,
        a transmission section configured to transmit torque from the rotor to a driveshaft,
        a bearing assembly section comprising the driveshaft and a plurality of bearings, wherein the driveshaft is configured to drive a drill bit connected to the positive displacement motor,
        a plurality of embedded sensors, wherein each embedded sensor has an embedded sensor type and an embedded sensor location in the positive displacement motor, the plurality of embedded sensors comprising:
            a first sensor with an ultrasonic sensor type disposed at a first location in the power section and configured to measure a thickness of the stator;
            a second sensor with a rotations per minute (RPM) sensor type disposed at a second location in the transmission section; and
            a third sensor with a temperature sensor type disposed at a third location in the bearing assembly section,
        a process control unit, and
        a communication line that axially traverses, at least a portion of, the positive displacement motor and connects the plurality of embedded sensors to the process control unit; and
    a computer communicably connected to the plurality of embedded sensors and comprises:
        one or more computer processors, and
        a non-transitory computer readable medium storing instructions executable by a computer processor, the instructions comprising functionality for:
            receiving, from the process control unit, a data stream from the plurality of embedded sensors;
            monitoring the data stream according to the embedded sensor type and the embedded sensor location;
            generating a first alert if an embedded sensor in the plurality of embedded sensors, as monitored by the data stream, resides outside a pre-defined range specific to the embedded sensor based on the embedded sensor type and the embedded sensor location;
            processing the data stream to predict a failure mode and time to the failure mode; and
            detecting a failure in the positive displacement motor based on the data stream and generating a second alert indicating the failure.

2. The non-transitory computer medium of claim 1, the instructions further comprising functionality for:
    displaying the data stream.

3. The non-transitory computer medium of claim 1, the instructions further comprising functionality for:
    processing the data stream with an anomaly detection algorithm.

4. The non-transitory computer medium of claim 1, the instructions further comprising functionality for:
    diagnosing a failure mode based on the data stream from the plurality of embedded sensors according to the embedded sensor type and the embedded sensor location.

5. The non-transitory computer medium of claim 1, the instructions further comprising functionality for:

recommending a change in the drilling parameters to prevent failure of the positive displacement motor based on the data stream from the plurality of embedded sensors.

6. The system of claim 1,
wherein a disconnection and a disconnection location are detected with the communication line.

7. The non-transitory computer medium of claim 6, the instructions further comprising functionality for:
identifying a twist-off location using the communication line; and
identifying a drop-off location using the communication line.

8. A method comprising:
providing a positive displacement motor, wherein the positive displacement motor comprises:
a power section comprising a stator and a rotor, wherein the rotor is configured to rotate within the stator in response to a passage of drilling mud,
a transmission section configured to transmit torque from the rotor to a driveshaft,
a bearing assembly section comprising the driveshaft and a plurality of bearings,
wherein the driveshaft is configured to drive a drill bit connected to the positive displacement motor,
a plurality of embedded sensors, wherein each embedded sensor has an embedded sensor type and an embedded sensor location in the positive displacement motor, the plurality of embedded sensors comprising:
a first sensor with an ultrasonic sensor type disposed at a first location in the power section and configured to measure a thickness of the stator;
a second sensor with a rotations per minute (RPM) sensor type disposed at a second location in the transmission section; and
a third sensor with a temperature sensor type disposed at a third location in the bearing assembly section,
a process control unit, and
a communication line that axially traverses, at least a portion of, the positive displacement motor and connects the plurality of embedded sensors to the process control unit;
receiving, by a computer processor, a data stream from the plurality of embedded sensors;
monitoring, by the computer processor, the data stream according to the embedded sensor type and the embedded sensor location;
generating a first alert if an embedded sensor in the plurality of embedded sensors, as monitored by the data stream, resides outside a pre-defined range specific to the embedded sensor based on the embedded sensor type and the embedded sensor location;
processing the data stream to predict a failure mode and time to the failure mode; and
detecting a failure in the positive displacement motor based on the data stream and generating a second alert indicating the failure.

9. The method of claim 8, further comprising:
displaying, using the computer processor, the data stream.

10. The method of claim 8, further comprising:
processing, by the computer processor, the data stream with an anomaly detection algorithm.

11. The method of claim 8, further comprising:
diagnosing, using the computer processor, a failure mode based on the data stream from the plurality of embedded sensors according to the embedded sensor type and the embedded sensor location.

12. The method of claim 8, further comprising:
recommending a change to a plurality of drilling parameters to prevent failure of the positive displacement motor based on the data stream from the plurality of embedded sensors.

13. The positive displacement motor of claim 8,
wherein a disconnection and a disconnection location are detected with the communication line.

14. The method of claim 13, further comprising:
identifying a twist-off location using the communication line; and
identifying a drop-off location using the communication line.

15. A positive displacement motor, comprising:
a power section comprising a stator and a rotor, wherein the rotor is configured to rotate within the stator in response to a passage of drilling mud;
a transmission section configured to transmit torque from the rotor to a driveshaft;
a bearing assembly section comprising the driveshaft and a plurality of bearings, wherein the driveshaft is configured to drive a drill bit connected to the positive displacement motor;
a plurality of embedded sensors, wherein each embedded sensor has an embedded sensor type and an embedded sensor location in the positive displacement motor, the plurality of embedded sensors comprising:
a first sensor with an ultrasonic sensor type disposed at a first location in the power section and configured to measure a thickness of the stator;
a second sensor with a rotations per minute (RPM) sensor type disposed at a second location in the transmission section; and
a third sensor with a temperature sensor type disposed at a third location in the bearing assembly section,
a process control unit; and
a communication line that axially traverses, at least a portion of, the positive displacement motor and connects the plurality of embedded sensors to the process control unit;
wherein the process control unit is configured to:
receive a data stream from the plurality of embedded sensors,
monitor the data stream according to the embedded sensor type and the embedded sensor location,
generate a first alert if an embedded sensor in the plurality of embedded sensors, as monitored by the data stream, resides outside a pre-defined range specific to the embedded sensor based on the embedded sensor type and the embedded sensor location,
process the data stream to predict a failure mode and time to the failure mode, and
detect a failure in the positive displacement motor based on the data stream and generate a second alert indicating the failure.

16. The positive displacement motor of claim 15, wherein the process control unit is further configured to:
process the data stream with an anomaly detection algorithm.

17. The positive displacement motor of claim 15, wherein the process control unit is further configured to:
diagnose a failure mode based on the data stream from the plurality of embedded sensors according to the sensor type and the sensor location.

18. The positive displacement motor of claim 15, wherein the process control unit is further configured to:
   determine and transmit a recommended a change to a plurality of drilling parameters to prevent failure of the positive displacement motor based on the data stream from the plurality of embedded sensors.

19. The positive displacement motor of claim 15, wherein the process control unit is further configured to:
   determine a disconnection and a disconnection location in the communication line; and
   identify a twist-off location in the positive displacement motor based the disconnection location.

\* \* \* \* \*